United States Patent [19]

O'Neill et al.

[11] Patent Number: 4,472,368

[45] Date of Patent: Sep. 18, 1984

[54] NEUTRALIZATION OF COOLING POND WATER IN PHOSPHORIC ACID PLANTS

[75] Inventors: Padraic S. O'Neill, Dublin, Ireland; Charles W. Weston, Prairieville, La.; Kyle D. Clevenger, Lakeland, Fla.; Jesse S. Chang, Baton Rouge, La.

[73] Assignee: Agrico Chemical Company, Tulsa, Okla.

[21] Appl. No.: 453,213

[22] Filed: Dec. 27, 1982

[51] Int. Cl.³ .......................... C01D 3/02; C01F 1/00; C01B 25/16
[52] U.S. Cl. .................................. 423/490; 423/167; 423/320; 423/321 R; 210/915; 241/15
[58] Field of Search ................... 423/167, 321 R, 320, 423/490; 210/915; 241/15

[56] References Cited

U.S. PATENT DOCUMENTS

| | | | |
|---|---|---|---|
| 114,693 | 5/1871 | Lewis | 423/167 |
| 4,113,184 | 9/1978 | Loughire | 423/167 |
| 4,171,342 | 10/1979 | Hirko et al. | 210/915 |
| 4,320,012 | 3/1982 | Palm et al. | 423/321 R |
| 4,374,810 | 2/1983 | O'Neill | 423/490 |
| 4,402,923 | 9/1983 | Lang | 423/320 |

*Primary Examiner*—Gregory A. Heller
*Attorney, Agent, or Firm*—Richards, Harris & Medlock

[57] ABSTRACT

An economical process for treating the acidic pond water to be used in the internal grinding circuit of a wet process phosphoric acid plant. Water is added to a quantity of a hydratable calcium compound, such as quicklime, to form a slaked lime slurry. A sufficient quantity of the slaked lime slurry is reacted with the acidic pond water to obtain a low fluoride solution having a fluoride content less than about 300 ppm and a pH in the range from about 2.0 to about 3.0, preferentially in the range 2.6–2.8, whereby calcium fluoride is precipitated. The precipitate bearing low fluoride solution is then clarified and the precipitate removed as underflow from the clarifier and transferred to the gypsum pond. In the preferred embodiment, the clarified low fluoride water is fed to the ball mill and is mixed with the phosphate rock being crushed. Removal of fluoride from the pond water solution reduced the "blinding effect" of the fluoride and permits the calcium carbonate in the phosphate rock to neutralized the acidic pond water to minimize corrosion in the mill and elsewhere in the plant. The resulting slurry from the ball mill is about 55% to 65% solids and ranges in pH range from about 5.0 to about 5.5. The phosphate rock slurry is then passed through a hydroclone circuit where the larger (heavier) particles are removed for recycling to the ball mill and the remaining lightweight particles in the rock slurry are processed by phosphoric acid plant.

7 Claims, 1 Drawing Figure

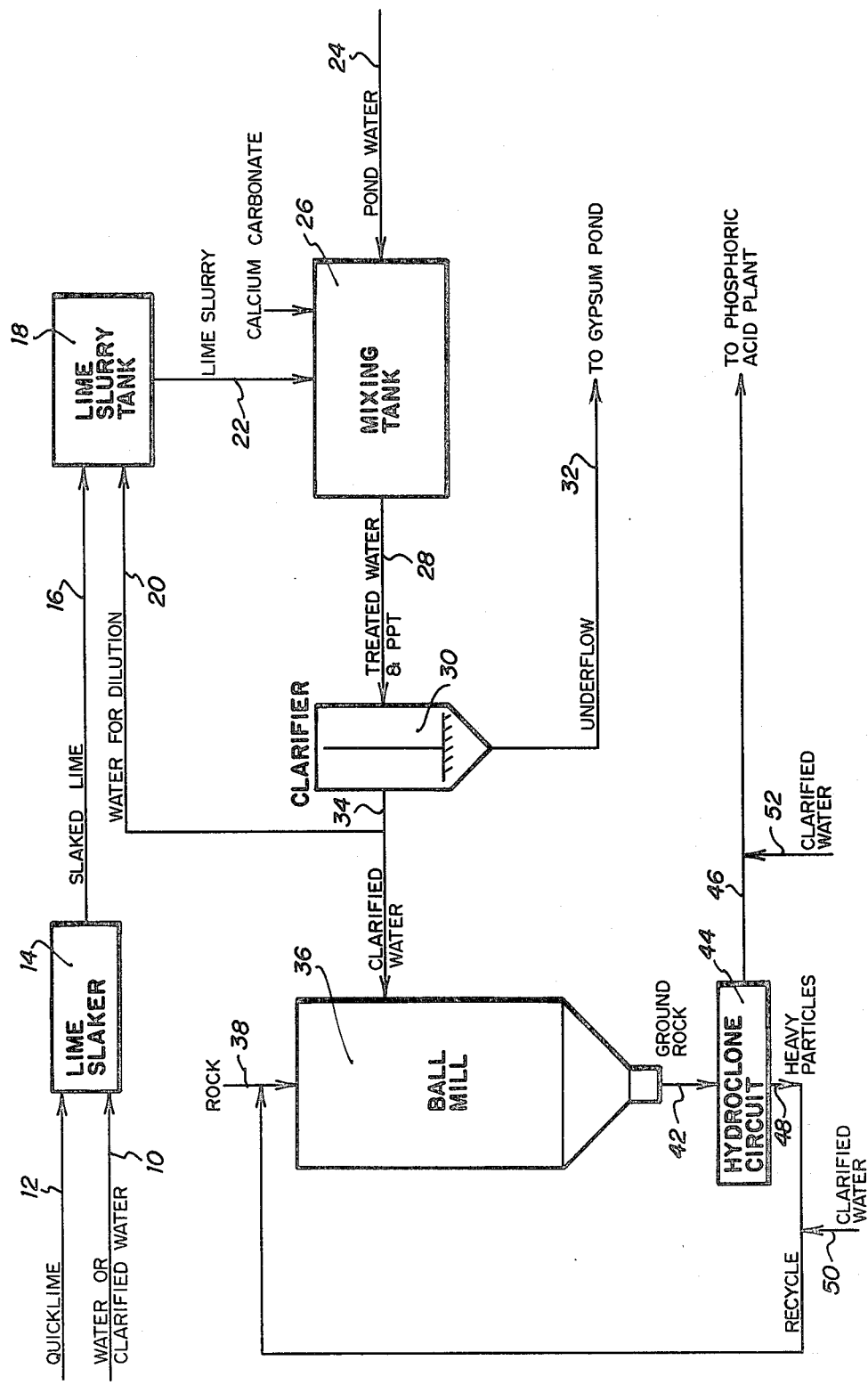

NEUTRALIZATION OF COOLING POND WATER IN PHOSPHORIC ACID PLANTS

TECHNICAL FIELD

The invention pertains to treatment of the acidic cooling pond water in a phosphoric acid plant, and more particularly to an economical process for treating acidic cooling pond water in a phosphoric acid plant to render it suitable for internal use in the phosphate rock grinding circuit.

BACKGROUND ART

Environmental constraints prohibit discharge of untreated acidic cooling pond water produced in phosphoric acid plants. During periods of heavy rainfall, run-off mixes with cooling pond water, which then must be processed by conventional water treatment plants before being discharged, considerably increasing the cost of plant operation.

Consumption of excess water in the phosphate rock grinding circuit of the phosphoric acid plant is one solution to the problem of excess pond water disposal. However, since excess water is mixed with acidic pond water, internal use of the water in the ball mill is impractical because the acidic pond water is highly corrosive.

At least two processes, the LANG process and the C.F. Industry process, are presently known for neutralizing pond water for use in the phosphate rock grinding circuit. In both, pond water is partially neutralized with ammonia. These two processes, however, are not completely satisfactory because the resulting rock-water slurry used in the ball mill is still somewhat corrosive, probably because of the "salt effect" of the ammonium ion remaining in the solution. Moreover, the ammonium ion in the remaining solution is a problem in subsequent processing because it causes excessive precipitation of sludge at the concentrator stage of the phosphoric acid unit.

An economical process, which avoids the corrosion problems of prior art processes, is therefore needed for treating excess cooling pond water to make it suitable for initial use in the grinding circuit of a phosphoric acid plant.

DISCLOSURE OF THE INVENTION

The present invention provides an economical process for treating acidic pond water of a phosphoric acid plant to render it suitable for internal use in the phosphate rock grinding circuit. According to the preferred embodiment of the invention, water is added to a quantity of quicklime to form a slaked lime slurry. The lime slurry is then reacted with acidic pond water to obtain a low fluoride solution having a pH in the range from about 2.6 to about 2.8, whereby calcium fluoride is precipitated. The calcium fluoride precipitate containing solution is then clarified to remove the calcium fluoride precipitate and to obtain a clarified low fluoride solution. The clarified low fluoride solution is mixed with phosphate rock in a ball mill where the rock is crushed to form a crushed rock slurry having a pH from about 5.0 to about 5.5 and containing rock crushed to a size such that 45%–55% by weight will pass a 200 mesh U.S.S. sieve. Crushed phosphate rock above a certain size is separated from the slurry and recycled to the ball mill for further grinding.

BRIEF DESCRIPTION OF THE DRAWINGS

For a more complete understanding of the present invention and for further objects and advantages thereof, reference is now made to the following Detailed Description taken in conjunction with the accompanying Drawings in which:

FIG. 1 is a block diagram illustrating the steps of the preferred embodiment of the present invention.

DETAILED DESCRIPTION

The present invention provides a cost effective process for internally consuming the acidic pond water byproduct of a phosphoric acid plant by treating the water with a calcium oxide or calcium carbonate, and using the treated water in the phosphate rock grinding circuit.

Although the presence of phosphates, fluorides and sulfates in cooling pond water is variable, typical pond water in a phosphoric acid plant might have, for example, a phosphate content of about 1.4% (14,000 ppm), a fluoride content of about 0.94% (9400 ppm), a sulfate content of 0.79% (7900 ppm) and lesser amounts of calcium oxide, sodium oxide and silicon dioxide.

Acidic cooling pond water normally might be expected to react with residual calcium cabonate in phosphate rock to give a near neutral, noncorrosive slurry. However, the high fluoride content of the pond water causes "blinding" of the calcium carbonate particles, which retards such a reaction. In the present invention, calcium oxide or calcium carbonate is selectively used to remove fluoride from the pond water as calcium fluoride, thereby reducing fluoride to a level below about 300 ppm. The phosphoric acid remaining in the treated pond water will then react rapidly with the carbonate in the phosphate rock to give a nearly neutral, noncorrosive rock slurry. The value of the phosphate immediately recoverable in this process more than justifies the treatment costs, economically.

FIG. 1 illustrates the treatment process of the present invention. A stream of ordinary water or clarified water 10 is combined with a hydratable calcium compound feed 12 in a lime slaker 14 to produce a slaked lime 16. In the preferred embodiment, quicklime or calcium oxide is the material of choice, although in terms of 1982 material costs, calcium carbonate is also an economically feasible material. The slaked lime 16 is then fed to a lime slurry tank 18, where additional water 20 is added to dilute the slaked lime to form a lime slurry 22 of selected consistency. The water 20 required for dilution may be clarified water produced by treating pond water as described below in greater detail, or ordinary water.

A stream of pond water 24 to be treated is pumped to a mixing tank 26 where the pond water is reacted with a predetermined quantity of lime slurry to form a treated water and precipitate mixture 28. When calcium carbonate is used as an alternative to slaked lime, it is added directly to mixing tank 26 as a ground solid. Preferably, the calcium carbonate should be ground such that at least 70% by weight will pass a 200 U.S.S. mesh. The reaction of the lime slurry and pond water in mixing tank 26 causes precipitation of calcium fluoride, calcium sulfate and other salts. The quantity of lime reacted with the pond water depends upon the flow rate of the pond water and in general is determined by generally acceptable practices to achieve a pH in the range 2.0–3.0, preferably in the range 2.6–2.8, to reduce the fluoride content of the pond water to less than about 300 ppm. This treated water and precipitate mixture 28 then goes to a rake clarifier 30 in which the precipitate is raked down toward the center bottom of the tank and discharged as an underflow 32, either to the gypsum pond as sludge water or the calcium fluoride may be recovered by subsequent treatment. Treated clarified water 34, which comes off the top of clarifier 30, is then fed directly to the ball mill, except for a minor amount 20 which may be used for dilution of the slaked lime in the slurry tank 18.

The clarified water fed to the ball mill 36 has a pH in the range 2.0-3.0, preferably in the range 2.6-2.8. In ball mill 36, phosphate rock 38 is mixed with the clarified water 34. The mill contains a charge of tumbling steel balls whose grinding action breaks up the phosphate rock. The pulverized rock slurry 42 which is discharged at the exit end of mill 36 contains some oversized, but primarily useable sized rock. The slurry 42 is nearly neutral, typically ranging in pH from about 5.0 to about 5.5. Following grinding, the rock 42 is further processed in screening equipment or in a hydroclone circuit 44 which contains a series of hydroclones for separating out the larger sized (heavier) rock particles from the smaller (lighter) ones. The smaller (lighter) rock particles 46 are sent to the phosphoric acid plant and the larger (heavier) particles 48 are recycled to the ball mill for further grinding. In the preferred embodiment, the smaller rock particles which remain in the slurry and which are sent to the phosphoric acid plant for processing are typically of a size such that 45%-55% by weight will pass through 200 mesh U.S.S. sieve.

Although in the above embodiment, the clarified water is consumed in the ball mill 36, the treated water may also be used in the recycle loop at step 50 or a portion added to the rock slurry 46 at step 52 before it is pumped to the phosphoric acid plant. Indeed, the clarified water may be beneficially consumed both in the ball mill 36 and added to the recycled slurry 48.

The mixing of clarified water having a pH in the range 2.0-3.0, preferably in the range 2.6-2.8, with the pulverized phosphate rock consumes excess pond water with acceptable levels of corrosion and produces a slurry having about 55% to 65% solids and a pH in the range 5.0 to 5.5 to further enhance the recovery of phosphates.

The following Examples illustrate the process of the present invention without limiting its scope in any way.

EXAMPLE 1

Acidic cooling pond water (at pH approximately 1.7) was fed to a reactor at an average rate of 950 gallons per minute through a manually controlled block valve. Quicklime was slurried to a paste using a slaker and fed directly (without dilution) to the reactor. Lime slaking was set to feed at 164 lbs. per minute using a 4-inch gate opening on a slaker weight feeder belt. Pond water flow to the reactor was adjusted to control the pH. The total reaction mass from the reactor overflowed into a second reactor which produced some additional retention time for the mixture to reach equilibrium before discharge to the clarifier. Table I summarizes the results which were obtained in actual plant runs over four different time periods. Daily samples (2 hour composites) taken from the lime reactor indicated the following:

TABLE I

| | Run | | |
|---|---|---|---|
| | I | II | III |
| | Treatment Rate-GPM | | |
| Water Quality (Clarified Water) | 950 | 950 | 950 |
| pH Range | 2.4-2.5 | 2.5-2.6 | 2.6-3.0 |
| $P_2O_5$ Range, ppm | 8600-11,000 | 8600-11,000 | 6000-10,600 |
| $P_2O_5$ Avg., ppm | 9700 | 9433 | 8214 |
| "F" Range, ppm | 24-280 | 50-280 | 20-100 |
| "F" Avg., ppm | 260 | 193 | 56 |

The process for recycling cooling pond water to the ball mill will result in an input of about 1-2% additional $P_2O_5$ into the phosphoric acid plant.

EXAMPLE 2

During the month of February, 1982, acidic cooling pond water was treated with slaked lime during four time periods to deterine the corrosive effects on the ball mill (Table II). The amounts of lime consumed and phosphates recovered were also determined. Use of treated water showed corrosion rates which were significantly superior to prior art processes. Moreover, cost benefit analysis, based on 1982 raw material costs, indicated an increased net savings measured in dollars per thousand gallons would be realized with increased pond water use, thereby making the process economical in its own right. Table II summarizes the results which were obtained.

TABLE II

| | Date | | | |
|---|---|---|---|---|
| | 1/30-2/3 | 2/5-2/8 | 2/10-2/16 | 2/19-2/23 |
| | Water Consumed million gal. | | | |
| Water Quality | 1.8 | 1.5 | 3.0 | 1.6 |
| pH Range | 2.5-2.9 | 2.7-2.9 | 2.4-2.8 | 2.5-2.7 |
| pH Average | 2.80 | 2.78 | 2.55 | 2.62 |
| $P_2O_5$ Range, ppm | 6400-6700 | 7000-8000 | 7900-9200 | 7400-8700 |
| $P_2O_5$ Average, ppm | 6640 | 7325 | 8514 | 7980 |
| "F" Range, ppm | 80-620 | 100-230 | 30-195 | 80-400 |
| "F" Average, ppm | 264 | 133 | 122 | 155 |
| Mill Corrosion*, MPY | 15** | 27 | 31 | 23 |
| Mill Exit pH, Avg. | 5.5 | 5.4 | 5.3 | 5.3 |

*Corrosion was measured using coupons.
**Clarified water used for 31 hours during this period.

The present invention thus provides an economical method of treating acidic pond water of a phosphoric acid plant to make it suitable for internal consumption in the ball mill with minimal, acceptable levels of corrosion.

We claim:
1. A process for treating waste acidic pond water including fluorides and phosphates from the production of phosphoric acid for reuse in said production, including ball-milling of phosphate-containing rock, comprising the steps of:
 (a) adding a calcium-containing material to said waste pond water in an amount effective to reduce waste fluoride concentration to less than about 300 ppm and to generally maintain a first pH of said waste water in a range from about 2.0 to about 3.0;
 (b) clarifying said waste pond water to remove fluoride-containing materials produced by said fluoride concentration reduction; and
 (c) thereafter mixing said clarified waste pond water having said waste phosphate material with said phosphate-containing rock to form a rock slurry having a resulting pH and solids content effective for the recovery of phosphates.

2. A process according to claim 1, wherein said calcium-containing material is selected from a group consisting of calcium carbonate and calcium oxide.

3. A process according to claim 2, wherein said calcium oxide is mixed with water to form a slaked lime slurry.

4. A process according to claim 1, wherein said first pH range is from about 2.6 to about 2.8.

5. A process according to claim 1, further including the steps of:

(d) crushing said rock in said slurry in said ball mill to a size distribution effective to pass about 45% to about 55% by weight through a 200 mesh U.S.S. sieve;

(e) separating said rock slurry into a first portion passable through said 200 mesh U.S.S. sieve and a second remaining portion; and (f) returning said second portion to said ball mill.

6. A process according to claim 5, further including the step of mixing at least a portion of said clarified waste pond water with said second portion prior to return to said ball mill.

7. A process according to claim 5, further including the step of mixing at least a portion of said clarified waste pond water with said first portion for additional processing to form said phosphoric acid.

* * * * *